US009643690B2

(12) United States Patent
Hessels

(10) Patent No.: US 9,643,690 B2
(45) Date of Patent: May 9, 2017

(54) TRANSFER SYSTEM, SHIP AND METHOD FOR TRANSFERRING PERSONS AND/OR GOODS TO AND/OR FROM A FLOATING SHIP

(71) Applicant: U-sea Beheer B.V., Drachten (NL)

(72) Inventor: Hendrik Hessels, Drachten (NL)

(73) Assignee: U-Sea Beheer B.V., Drachten (NL)

( * ) Notice: Subject to any disclaimer, the term of this patent is extended or adjusted under 35 U.S.C. 154(b) by 43 days.

(21) Appl. No.: 14/442,310

(22) PCT Filed: Nov. 19, 2013

(86) PCT No.: PCT/NL2013/050833
§ 371 (c)(1),
(2) Date: May 12, 2015

(87) PCT Pub. No.: WO2014/077694
PCT Pub. Date: May 22, 2014

(65) Prior Publication Data
US 2016/0304169 A1    Oct. 20, 2016

(30) Foreign Application Priority Data

Nov. 19, 2012    (NL) .................................... 2009834

(51) Int. Cl.
| | |
|---|---|
| B63B 21/00 | (2006.01) |
| B63B 27/30 | (2006.01) |
| B63B 27/14 | (2006.01) |
| B65G 67/60 | (2006.01) |
| B63B 27/10 | (2006.01) |
| B63B 27/24 | (2006.01) |

(52) U.S. Cl.
CPC ............ *B63B 27/30* (2013.01); *B63B 27/143* (2013.01); *B65G 67/60* (2013.01); *B63B 21/00* (2013.01); *B63B 27/10* (2013.01); *B63B 27/24* (2013.01); *B63B 2027/141* (2013.01); *B65G 2814/0397* (2013.01)

(58) Field of Classification Search
CPC ....... B63B 27/30; B63B 27/10; B63B 27/143; B63B 27/24; B63B 2027/141; B63B 21/00; B65G 67/60; B65G 2814/0397
USPC ................. 14/31, 36, 37, 42, 69.5, 70–71.7; 114/362
See application file for complete search history.

(56) References Cited

U.S. PATENT DOCUMENTS

| | | | |
|---|---|---|---|
| 1,161,680 A | | 11/1915 | Hulett |
| 2,188,686 A | * | 1/1940 | Kersting ................. B66C 23/72 14/36 |

(Continued)

FOREIGN PATENT DOCUMENTS

| | | |
|---|---|---|
| GB | 2061833 | 5/1981 |
| WO | WO-8702723 | 5/1987 |
| WO | WO-2012138227 | 10/2012 |

*Primary Examiner* — Raymond W Addie
(74) *Attorney, Agent, or Firm* — Marcus C. Dawes; Daniel L. Dawes

(57) ABSTRACT

A transfer system, ship and method for transferring persons and/or goods to and/or from a floating ship (102). The transfer system according to the invention comprises: a pedestal (114); an integrated gangway boom crane (104) connected to the pedestal; and an actuator (122) acting between the pedestal (114) and the integrated gangway boom crane (104) configured for rotating the integrated gangway boom crane relative to the pedestal.

20 Claims, 10 Drawing Sheets

(56) References Cited

U.S. PATENT DOCUMENTS

| | | | | |
|---|---|---|---|---|
| 2,315,942 A * | 4/1943 | Deist | ............... | B66C 23/72 |
| | | | | 14/36 |
| 4,011,615 A * | 3/1977 | Maxson | ............... | B63B 27/14 |
| | | | | 138/118 |
| 4,333,196 A * | 6/1982 | Bougaran | ............... | E01D 15/24 |
| | | | | 14/71.7 |
| 4,590,634 A * | 5/1986 | Williams | ............... | E01D 15/24 |
| | | | | 114/230.1 |
| 4,633,591 A * | 1/1987 | Pikora | ............... | B43L 7/14 |
| | | | | 33/452 |
| 5,586,516 A * | 12/1996 | Hagen | ............... | B63B 27/143 |
| | | | | 114/362 |
| 6,347,424 B1 * | 2/2002 | Vatne | ............... | B63B 27/14 |
| | | | | 14/34 |
| 6,356,038 B2 * | 3/2002 | Bishel | ............... | H04M 11/007 |
| | | | | 315/287 |
| 7,950,096 B2 * | 5/2011 | Williamson | ............... | B63B 27/14 |
| | | | | 114/362 |
| 8,006,337 B2 * | 8/2011 | Birmingham | ............... | B63B 27/143 |
| | | | | 114/362 |
| 8,950,353 B2 * | 2/2015 | Rohden | ............... | B63B 27/14 |
| | | | | 114/362 |
| 2013/0334158 A1 * | 12/2013 | Koch | ............... | B65G 67/603 |
| | | | | 212/291 |

* cited by examiner

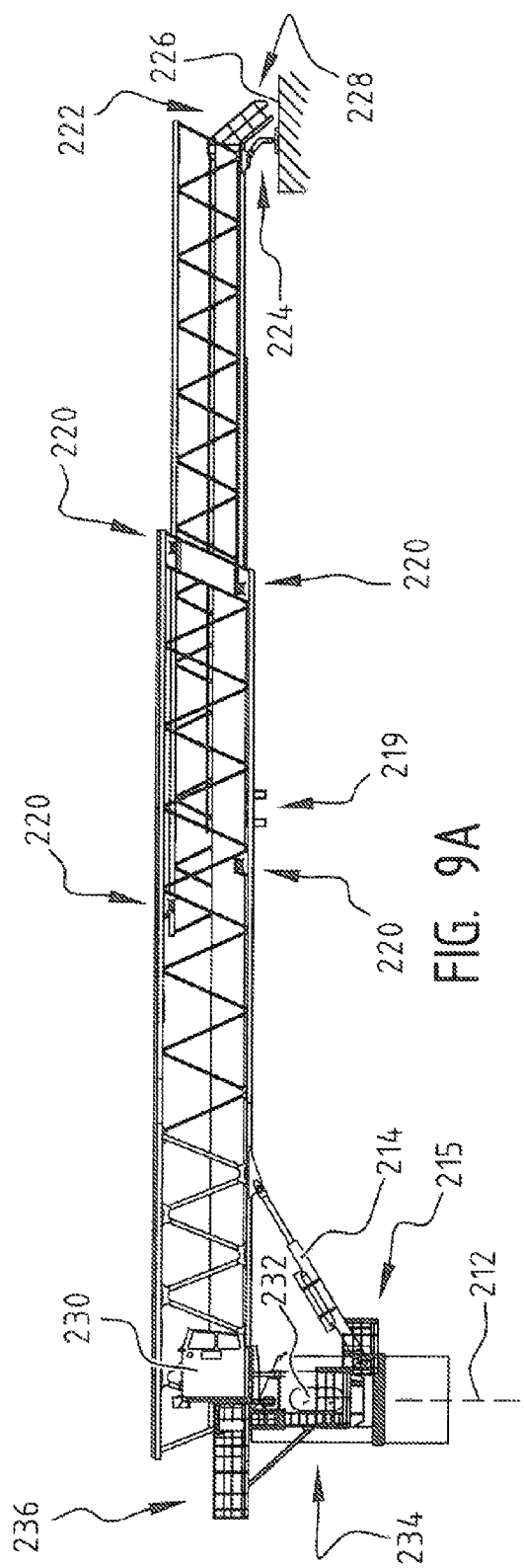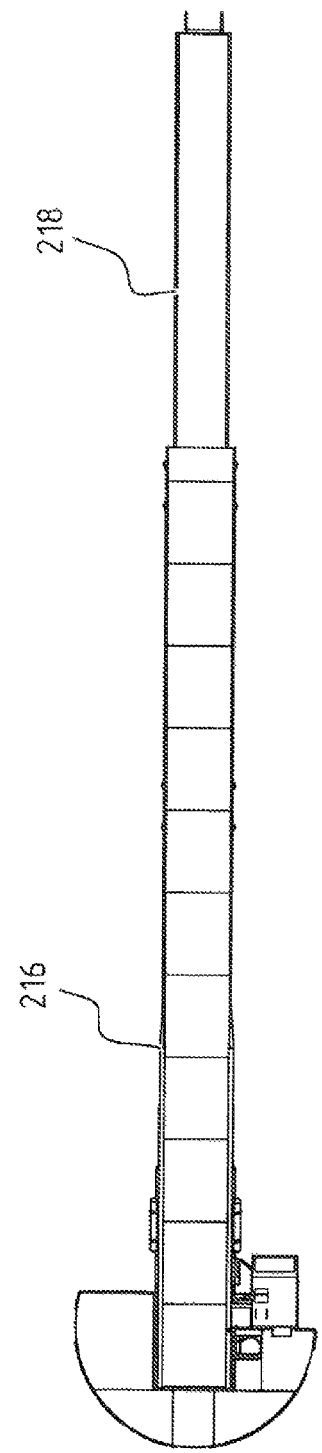
FIG. 9A
FIG. 9B

TRANSFER SYSTEM, SHIP AND METHOD FOR TRANSFERRING PERSONS AND/OR GOODS TO AND/OR FROM A FLOATING SHIP

The present invention relates to a transfer system for transferring persons and/or goods from and/or to a floating ship. Goods can be transferred from this floating ship to another floating ship and a platform at shore or off-shore, for example.

At present, human transfer from an offshore support vessel or offshore construction vessel to a fixed or other floating unit should take place under very moderated conditions. In addition, for regular maintenance to (unmanned) units all kind of human transfer needs to be carried to and from these units. These activities are currently hand carried by workers travelling to the unit with small RIB's or by means of other access or lifting systems. Boarding of the Accessed Unit (AU) from the small boats can lead to dangerous situations when waves increase. Transfer of good by means of a crane is not always possible. Therefore, boarding of such a unit from other systems, such as a vessel, is too complex and/or not suitable to be on stand-by mode. This may lead to dangerous situations when waves increase and/or bad weather conditions, for example.

WO2012/138227 describes a transfer system, ship and method for transferring persons to and/or from a floating ship. This system requires a pedestal, a boom crane and a gangway both connected to the pedestal.

The object of the present invention is to provide a transfer system for transferring persons and/or goods to another ship, a floating ship, a platform at shore or off-shore that can be used in a larger window of conditions like weather and/or tide conditions, and/or offers more functionality.

This object is achieved with a transfer system for transferring persons and/or goods from and/or to a floating ship according to the invention, the system comprising:
- a pedestal;
- an integrated gangway boom crane connected to the pedestal; and
- an actuator acting between the pedestal and the integrated gangway boom crane configured for rotating the integrated gangway boom crane relative to the pedestal.

The system comprises a fixed or stationary pedestal or another constructional part that can be considered a pedestal for the system according to the invention. Preferably the system comprises a base frame and slew bearing enabling rotational movement of the gangway relative to the pedestal. The system further comprises an integrated gangway boom crane, preferably an offshore integrated gangway boom crane. Preferably, the crane is installed on a single column, the so-called pedestal. Preferably, the pedestal is fixed to a vessel. Preferably, the pedestal and/or integrated gangway boom crane are capable of luffing and slewing.

The combination of pedestal and integrated gangway boom crane that can be manipulated with the actuator, provides a robust and flexible system for transferring people and/or goods from and/or to a vessel or other unit provided with such system. Providing an integrated gangway boom crane with a, preferably hydraulic, actuator omits the need for a separate crane to enable positioning the gangway in a substantial vertical plane.

In a presently preferred embodiment the integrated gangway boom crane involves a base frame that may rotate relative to the pedestal around a substantial vertical axis with a slew bearing. Preferably, a HPU is mounted on the base frame to provide an effective configuration. The gangway may rotate around a substantial horizontal axis relative to the base frame preferably using one or more cylinders.

The actuator enables rotation of the integrated gangway relative to the pedestal, preferably around a substantial horizontal axis, over a relative large window of angles, preferably in a range of −25° to +30°, more preferably in a range of −23° to +27°, relative to the horizontal. This enable downward and upward transfer of persons and/or goods between pedestal and accessed unit.

A control system controls the integrated gangway boom crane, preferably together with a hoist system. The control system controls the movement of the integrated gangway boom crane and hooking up the accessed unit. The accessed units can be either a quay, a fixed or floating offshore unit (like platform, semi, drillship), windmill, or another vessel and/or other accessed unit (AU) comprising both AFU (for fixed) and AMU (for motion) accessed units.

Preferably a de-icing and/or anti-icing system is provided to further enhance the window of operation for the integrated gangway according to the present invention. Optionally, preferably in combination with a de-icing system, a deluge system is provided to further improve the gangway according to the present invention.

In a presently preferred embodiment the system further comprises a hoist system that is integrally provided with the gangway boom crane. This provides further flexibility to the transfer system and omits the requirement for a separate crane thereby reducing cost and maintenance.

In a presently preferred embodiment the crane comprises rotational means for rotating around a substantial vertical axis. In addition, or alternatively, the crane comprises further rotational means for rotating around a substantial horizontal axis. This enables providing the gangway under an angle with sea level, for example.

The system according to the invention enables transportation of goods/equipment and/or human transfer from the offshore support vessel (OSV) and/or the offshore construction vessel (OCV) to the accessed unit (AU). More specific, the system enables the OSV and/or OCV to be in continuous contact with the AU, while human transfer is guaranteed.

The goods to transfer include as examples canned fluids, spare parts and paint. Other goods are also possible to transfer with the system according to the invention.

The hoist system provides a second function besides the transferring function of the integrated gangway boom crane. For example, the hoist system may lift goods when the transfer function of the gangway is not in use. In addition, the hoist system may guide the transfer of goods along the gangway thereby combining both functions. The integrated gangway boom crane provides a means for transferring goods and/or persons requiring a limited number of parts thereby achieving a cost effective crane.

Preferably, the integrated gangway boom crane comprises at least two telescopic parts. This enables amending the length of the crane and, therefore, the window of operation. In a presently preferred embodiment the free end of the telescopic part is provided with a ball joint.

Preferably, the integrated gangway boom crane comprises locking and/or clamping means for locking and/or clamping the telescopic parts when in use. So, for heavy duty operations the integrated gangway boom crane can be considered as a unitary beam providing strength and stability to the system. Such locking system and/or clamping system maintain the telescopic parts in a fixed position when the transfer and/or hoisting function is operative. Such means may comprise a skid, rollers and the like. In a presently preferred embodiment according to the present invention the integrated gangway boom crane comprises an auxiliary boom.

Providing an auxiliary boom enables manoeuvring the hoist system more precisely without requiring the entire integrated gangway boom crane to be repositioned. This improves flexibility and prevents a standstill of the crane for repositioning.

Preferably, the auxiliary boom comprises a first hinge enabling rotation around a substantial horizontal axis. This rotation enables to provide the auxiliary boom at an angle in a vertical plane relative to the gangway boom crane. This increases the possibilities for handling positions with different height above the water level, for example.

Preferably, the auxiliary boom comprises a second hinge enabling rotation around a substantial vertical axis. This rotation enables to provide the auxiliary boom at an angle in a horizontal plane relative to the gangway boom crane. This increases the possibilities for handling positions with a mast or building that blocks the straightforward position, for example. Furthermore, optionally the auxiliary boom comprises two or more telescopic parts to adapt the working length of the boom to the needs under specific circumstances.

In a presently preferred embodiment according to the present invention, the transfer system further comprises an auxiliary hoist system.

Providing an auxiliary hoist system further improves the overall flexibility for lifting and/or guiding. In a presently preferred embodiment the auxiliary hoist system is functionally connected to the auxiliary boom. In this embodiment the other hoist system is operatively connected to the gangway. For example, this enables heavy loads to be lifted by the hoist system of the gangway and, in addition, enables lifting less heavy loads by the auxiliary hoist system that provides an improved manoeuvrability when handling these loads.

In a presently preferred embodiment according to the present invention the system also enables transfer of media fluids like process media, concrete etc. via an umbilical, for example. Preferably, this umbilical is connected to the bottom of the gangway system.

In a presently preferred embodiment according to the invention the system comprises a double lift system and/or double lift mode. The double lift system and/or mode enables an operator to load and unload goods up to 2 t to the accessed unit, for example. The system increases the workability of the operator during its activities.

In a presently preferred embodiment according to the invention the transfer system comprises connecting means for connecting the system and the accessed unit.

By providing the system with connecting means a continuous contact between the system and the accessed unit is achieved. In a presently preferred embodiment at least the telescopic boom crane is provided with connecting means. The connecting means supports the gangway. This achieves a stable and robust connection between a floating ship (OCV or OSV) and the accessed unit. The system according to the invention guarantees this connection over a wide range of conditions, including relatively large waves and/or wind and rain.

The system according to the invention provides safe handling of equipment part and/or human transfer to and from the AU, in a preferred embodiment without requiring any (major) modifications needed on the AU. In addition, the system is suitable to be connected during longer operations. In a presently preferred embodiment the system according to the invention is a modular system that is easy to handle and store, and/or is capable of handling weights up to 10 t, for example, and/or allowing continuous human transfer at a safe distance between AU and the floating ship. Preferably, goods can also be transferred by umbilical handling to AU.

In a presently preferred embodiment according to the invention the transfer system comprises vertical displacement compensation means.

By providing the vertical displacement compensation means, during transfer of persons and/or goods the system is able to compensate the vertical displacements to a significant extent. In this mode of transferring persons and/or goods the vertical displacement is the largest disturbance. Other displacements and rotations are relatively limited in this mode. However, according to the invention also compensation means may be provided for other movements. In a presently preferred embodiment the compensation means comprise an active heave compensator. This compensates at least the vertical movements between the pedestal and the accessed unit. This compensator compensated undesired movement.

Preferably, the control means interact with the compensation means to accommodate the operation of the transfer system according to the invention in a relatively wide range of operating or sea conditions. This improves the efficiency of the transfer such that waiting times for safe transport and transfer conditions are significantly reduced. The compensation means, also referred to as Active Motion Compensation (AMC) means, improve the working window of the transfer system by minimizing the relative motion between the pedestal and head platform of the transfer system on one hand and the accessed unit on the other. For example, this reduces downtime of windmills in need of repair.

In a presently preferred embodiment according to the invention the TGW comprises supporting means for supporting the TGW after connecting to the AU.

The supporting means provide self-supporting functionality to the system after connection to the AU. When the system goes from the connect or AU mode, wherein the gangway is connected to the AU, into a free floating mode the system is capable to compensate the six degrees of freedom (DOF), i.e. translation and rotation in three directions.

In a presently preferred embodiment according to the invention the system further comprises a wireline for connection to the AU.

By providing the wireline for the AU mode the system has a wireline connection with AU, especially the AMU. Preferably, this wireline connection is achieved by a hoist system for connection to other floating vessels. This system actively translates the displacement in vertical direction.

In a preferred embodiment according to the invention the transfer system further comprises a power supply.

Instead of using the power supply of the ship and/or shore or platform a separate power supply for the transfer system may be provided. This achieves a stand-alone system. Preferably, the power supply is integrated in the housing of the system thereby achieving a modular system.

The present invention also relates to a ship provided with the above transfer system.

Such ship provides the same effects and advantages as those related to the transfer system. Such ship may relate to an offshore support vessel (OSV) and/or an offshore construction vessel (OCV).

The invention further also relates to a method for transferring persons and/or goods to and/or from a floating ship using the system as described above.

Such method provides the same effects and advantages as those related to the system and the ship.

Further advantages, features and details of the invention are elucidated on basis of preferred embodiments thereof, wherein reference is made to the accompanying drawings wherein.

Figure 8:
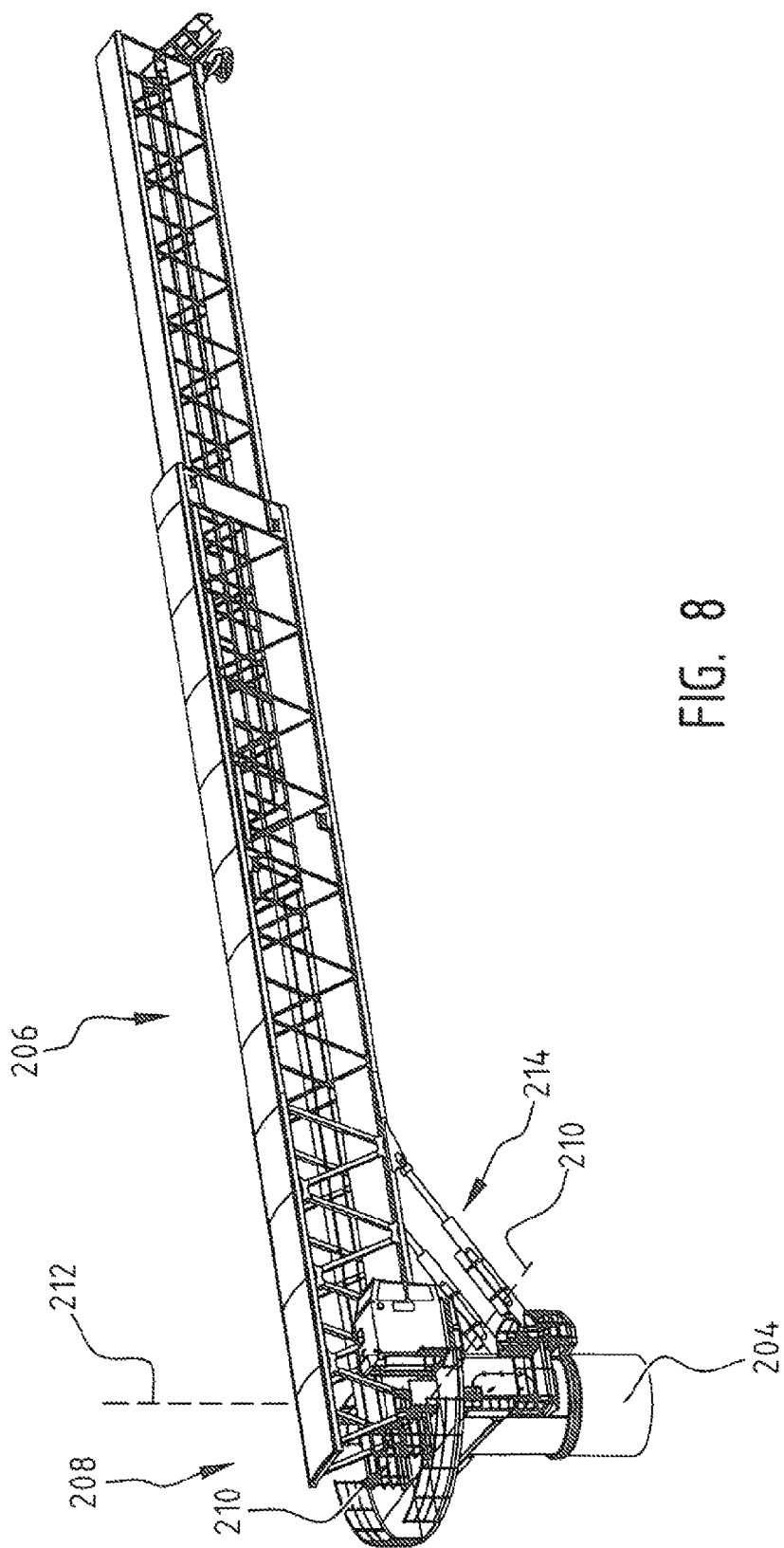
FIG. 8 shows a gangway.
Figure 9C:
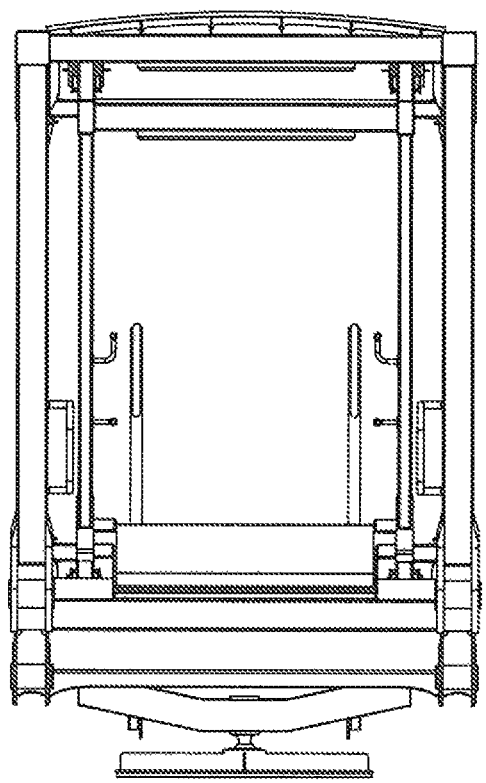
Figure 9D:
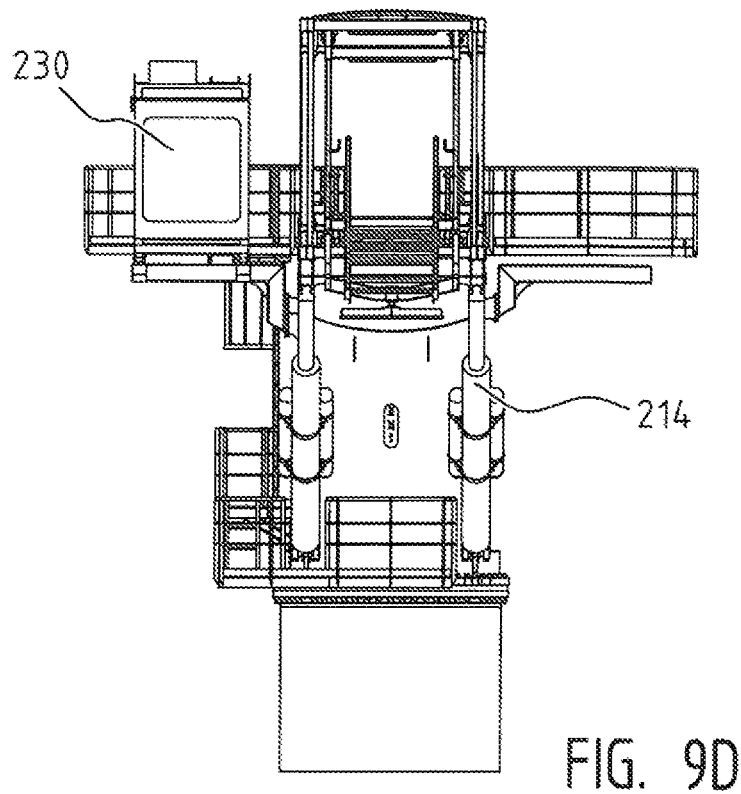
Figure 9E:
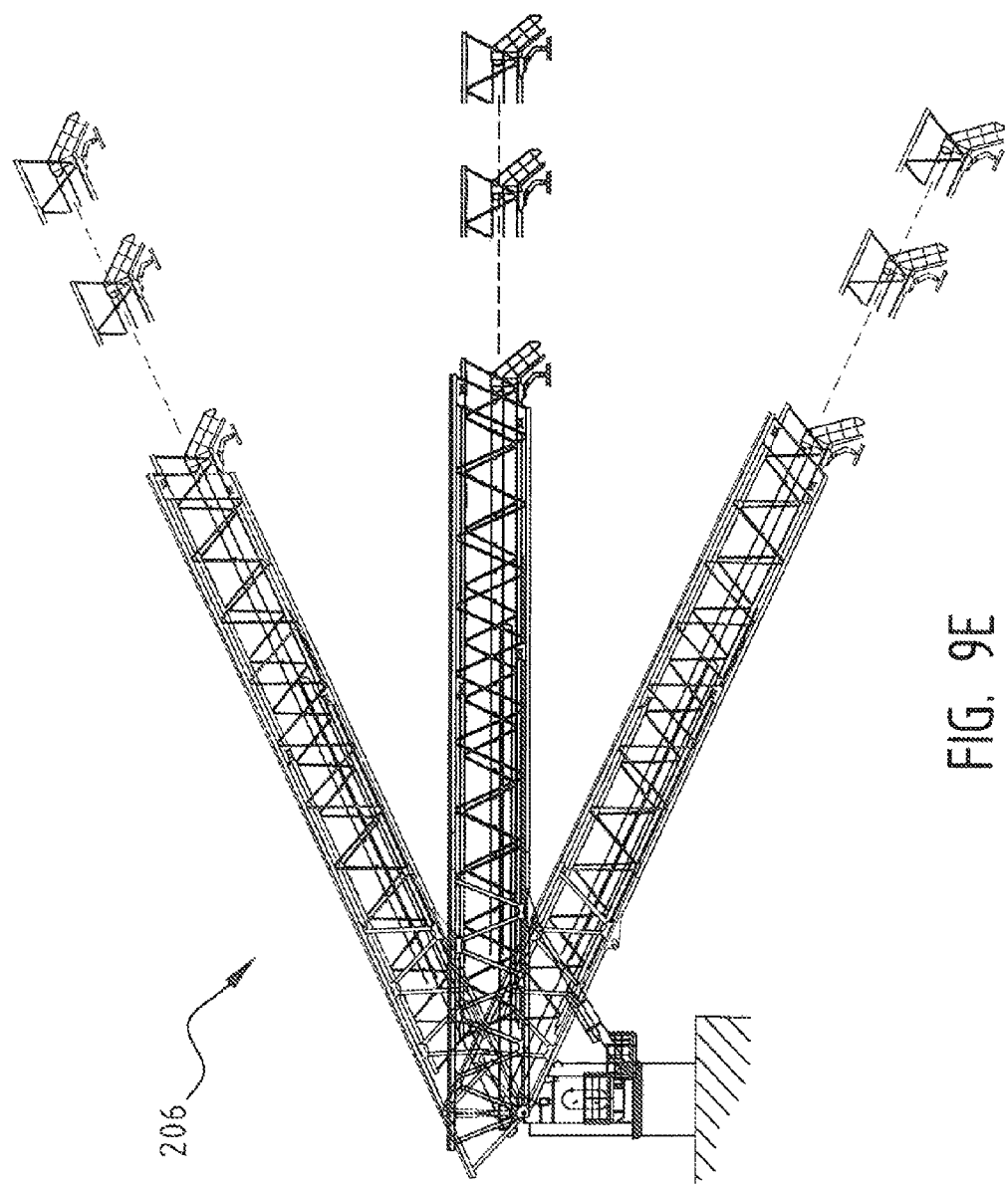
Figure 9F:
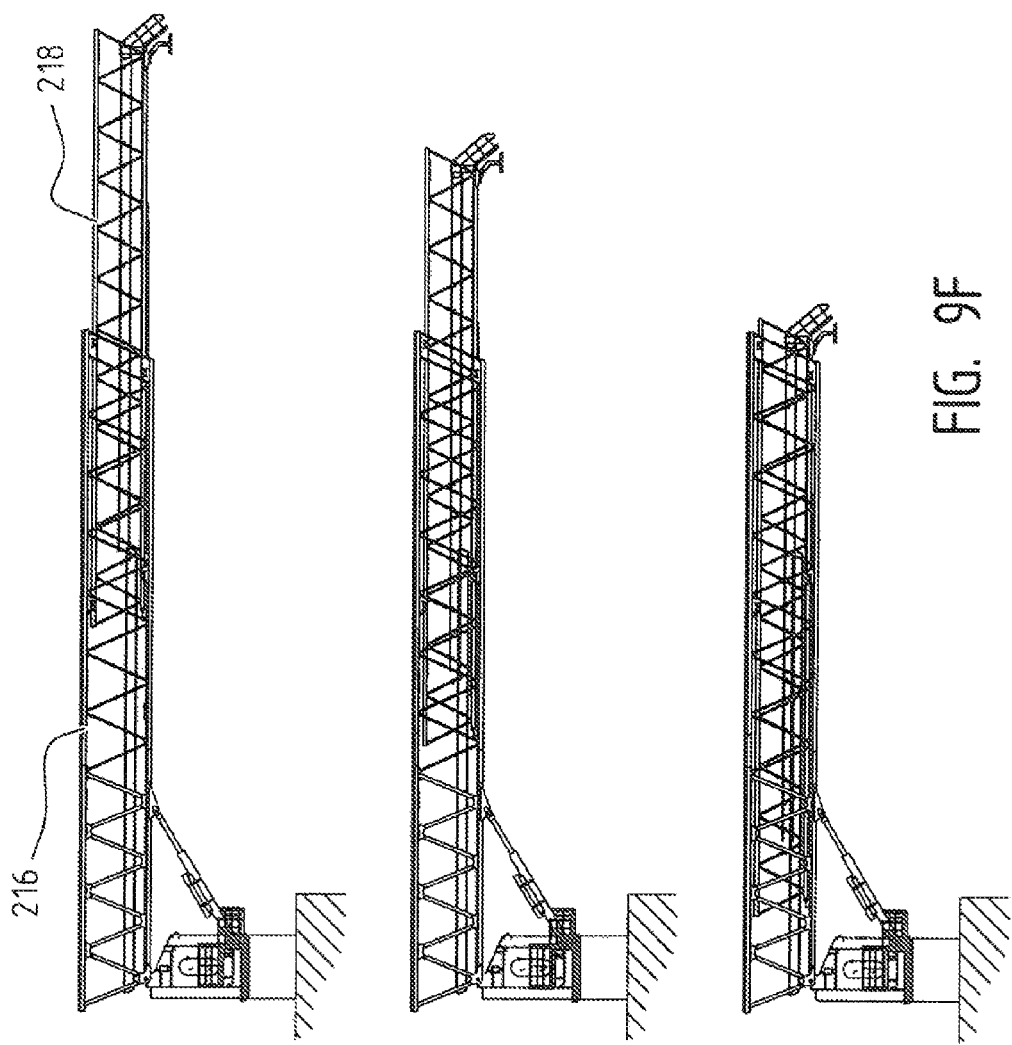

FIG. 9 A-F shows details of the gangway of FIG. 8.

Figure 1:
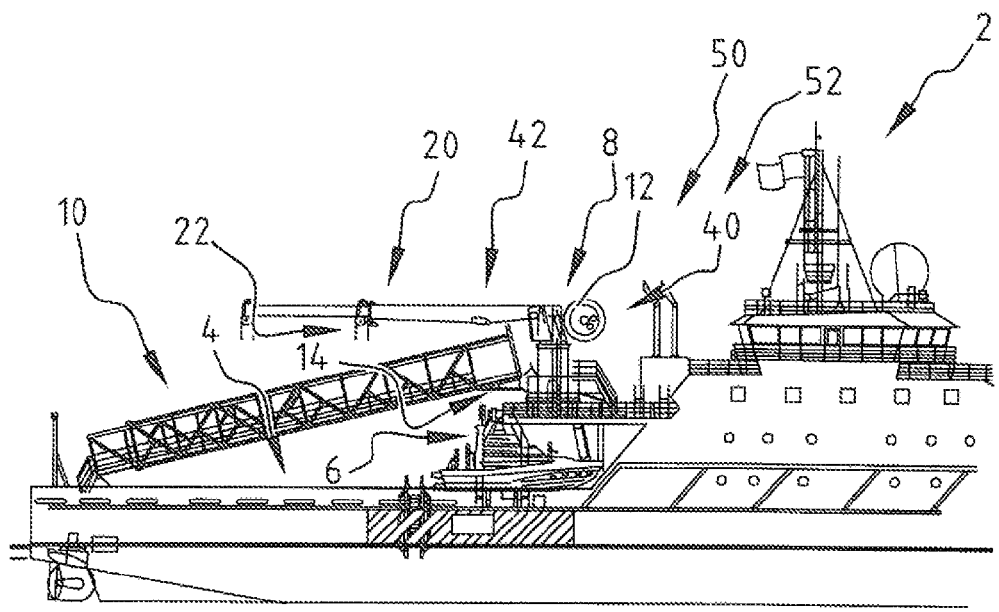
FIGS. 1-6 show a vessel provided with a transfer system according to the prior art.
Figure 2:
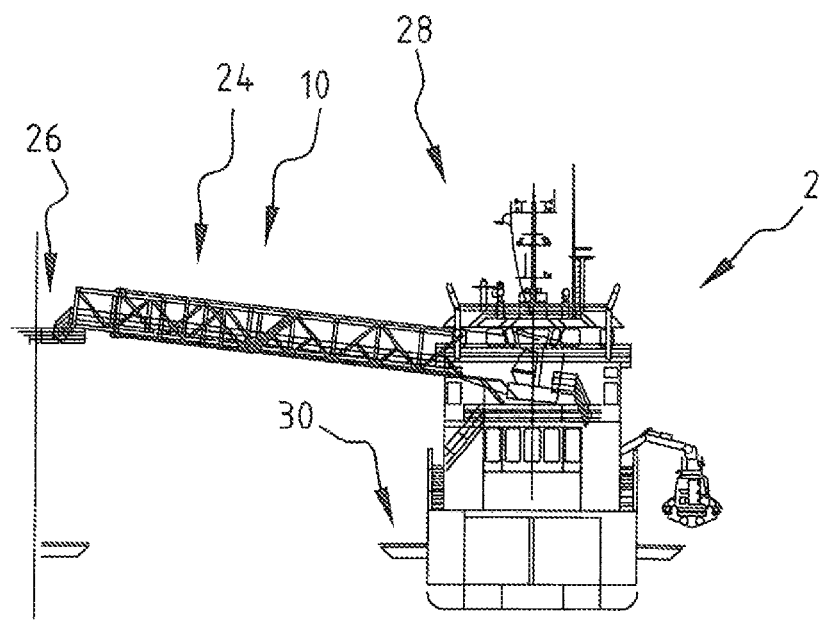

Vessel 2 (FIG. 1) is provided with deck 4 on which pedestal 6 is provided. Pedestal 6 comprises telescopic boom crane (TBC) 8 and Telescopic Gangway (TGW) 10. TBC 8 and TGW 10 are both connected to pedestal 6 with separate axes 12, 14 respectively, enabling rotation around substantially a horizontal axis. Pedestal 6 comprises rotating means 16 enabling rotation around a substantially vertical axis 18. TBC 8 comprises a telescopic boom 20 with hoist 22. TGW 10 comprises a telescopic gangway 24 that is provided with supporting means 26. The Telescopic Access Bridge & Crane (TABC) 28 (FIG. 2) enables transfer of people and/or goods over water 30, for example.

Figure 3:
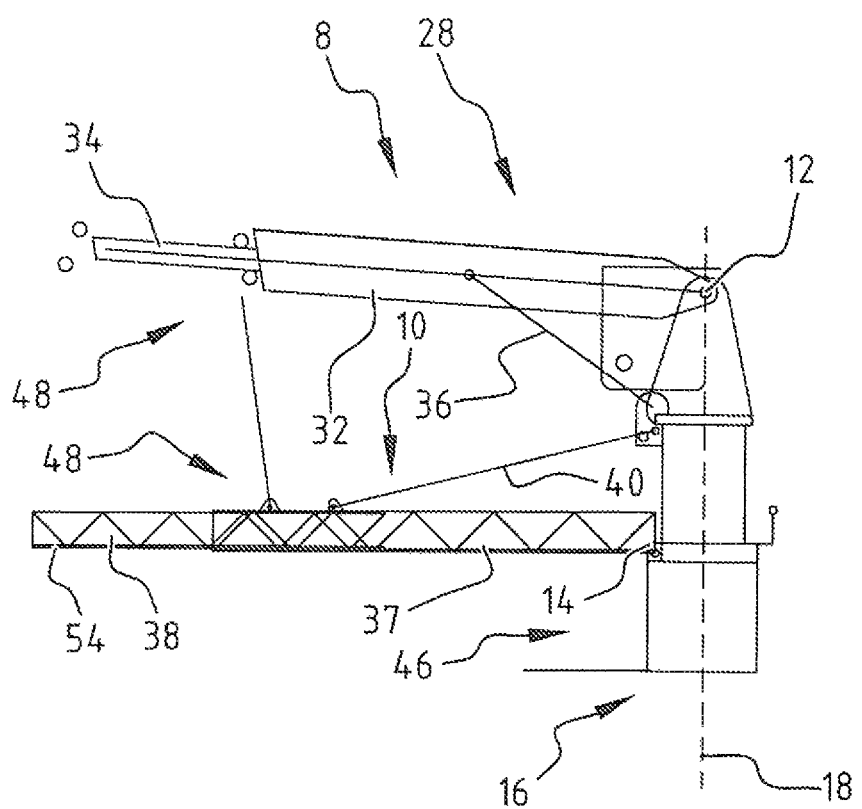

Telescopic boom 20 comprises stationary part 32 (FIG. 3) and extendable part 34 that are manipulated with cylinder 36 controlling the angle relative to axis 12. Telescopic gangway 24 comprises stationary part 37 and extendable part 38. When positioning TGW 8 hoist 22 connects TGW 10 to TBC 8. Optionally, cylinder 40 or other connecting means controls the angle relative to axis 14.

Controller 42 controls the movement of TBC 8 and TGW 10, for example by controlling cylinder 36 and hoist 22.

Figure 4:
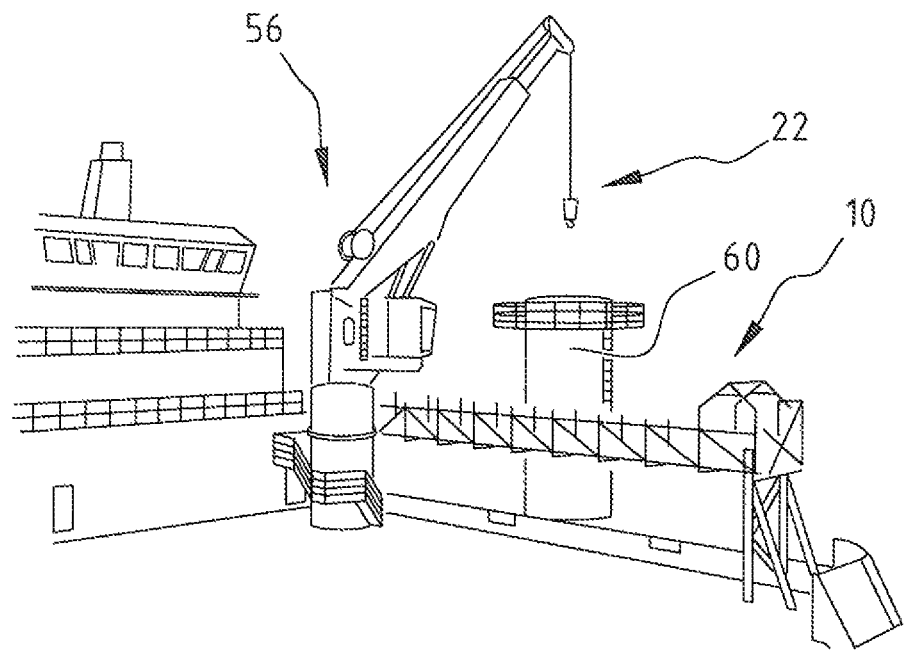
Figure 5:
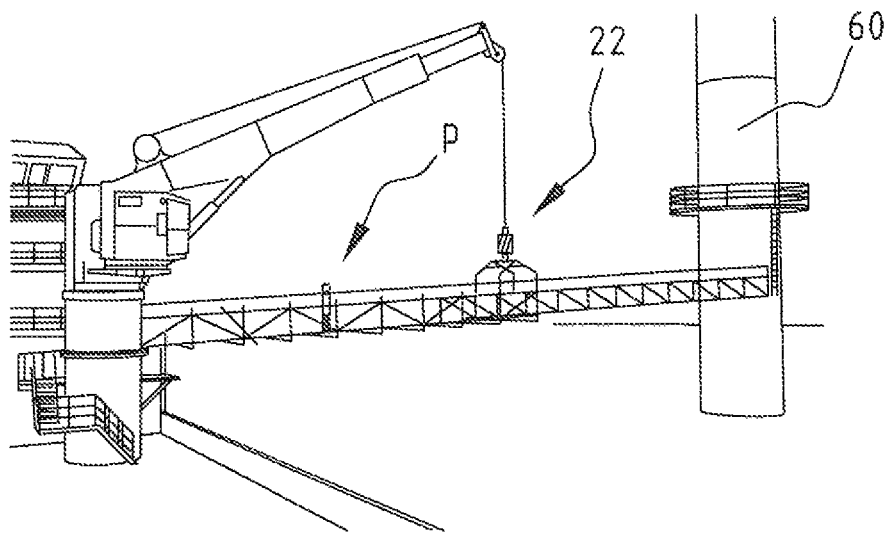
Figure 6:
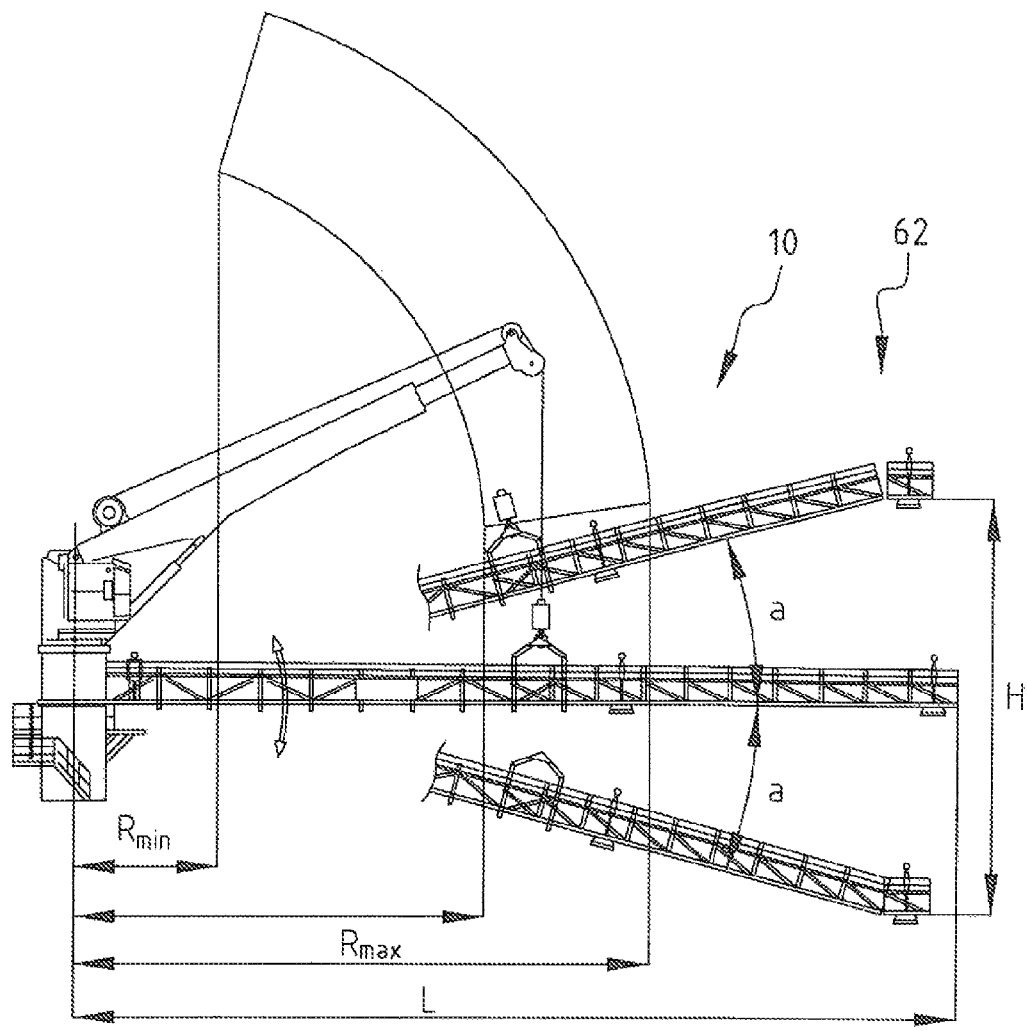

An alternative system according to the invention relates to Telescoping Access Bridge & Crane (TABC) 56 (FIGS. 4-6). System 56 has similar components as described for Telescopic Access Bridge & Crane (TABC) 28 and only relevant different and/or additional features will be described. TGW 10 enables access to unit 60 in the connected mode.

Figure 7:
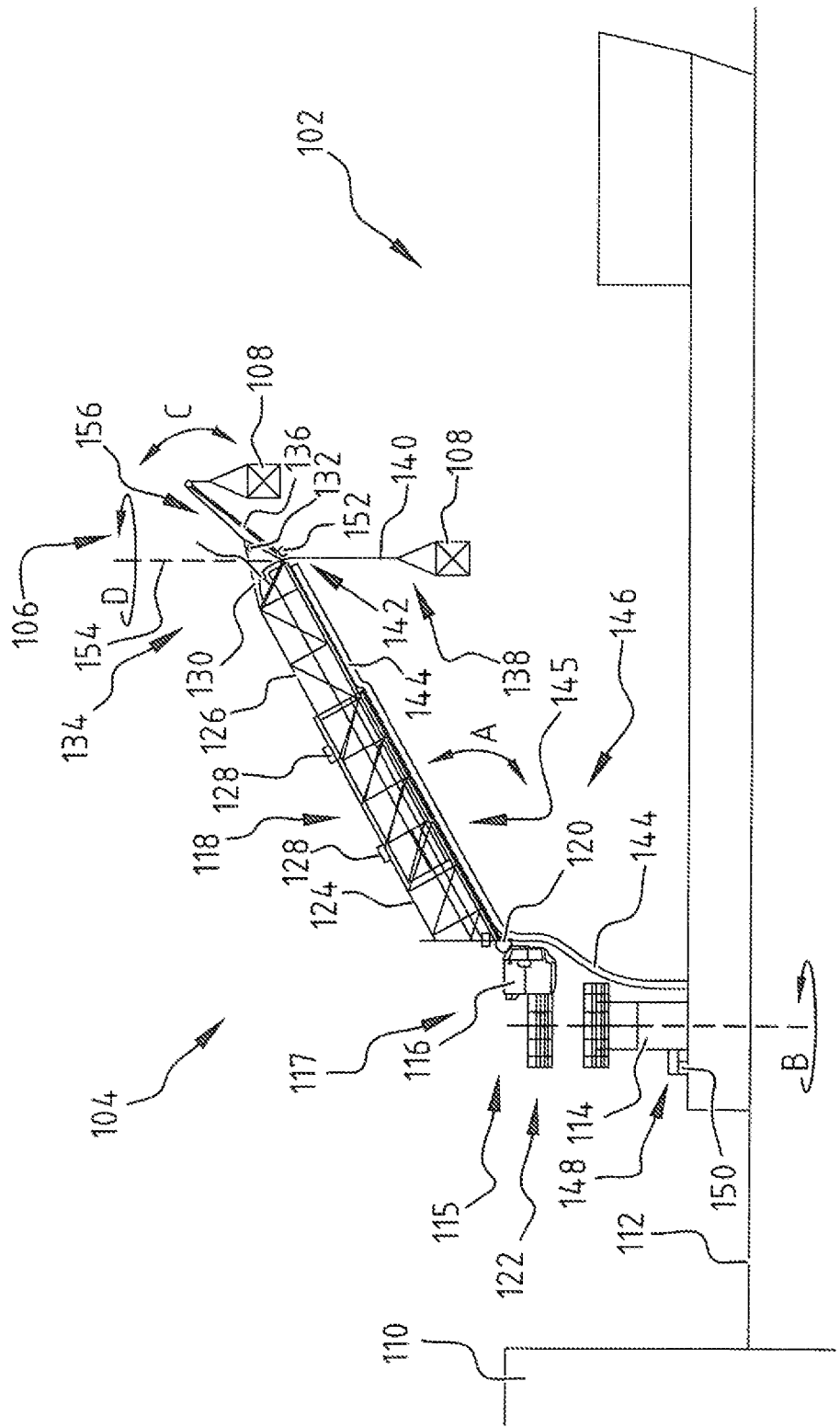
FIG. 7 shows a vessel provided with a transfer system according to the invention.

Vessel 102 (FIG. 7) is provided with gangway boom crane 104 with a hoist system 106 for transferring people and/or goods 108 from the vessel to a quay 110, for example, and vice versa at sea 112. Crane 104 comprises a pedestal or stationary part 114 with cabin 116. In the illustrated embodiment cabin 116 is provided with controller 115 that also controls compensation means 117 for compensating waves in water 112, for example.

The gangway boom 118 is connected via a first hinge 120 for rotation around a substantial horizontal axis in direction A to pedestal 114. In addition, gangway boom 118 is provided with rotation means 122, for example comprising a slew-bearing, for rotation of gangway boom 118 around a substantial vertical axis in a direction B.

In the illustrated embodiment gangway boom 118 is provided with main telescopic part 124 and auxiliary telescopic part 126 enabling adapting the length of the boom to the needs. Telescopic parts 124, 126 are clamped together with clamping means 128 to achieve a robust and stable boom when transferring people and/or goods.

Furthermore, crane 104 is provided with hoist system 106 enabling lifting and lowering goods 108 with cable 130 using guiding means 132. In the illustrated embodiment gangway boom 118 is at its free end 134 provided with auxiliary boom 136. As illustrated goods 108 can be lifted with hoist system 106 from auxiliary boom 136.

Auxiliary boom 136 can be rotated around a substantial axis with hinge 152 in a direction C and, optionally, around a substantial vertical rotation axis 154 with rotation means 156 in a direction D. Furthermore, auxiliary boom 136 can be provided with telescopic parts (not shown).

In the illustrated embodiment an auxiliary hoist system 138 can be provided for system 104 with cable 140 guided with guiding means 142 lifting goods 108 from the free end 134 of gangway boom 118. It will be understood that hoist system 106 and auxiliary hoist system 138 can be switched such that the main system operates from free end 134 and the auxiliary system from the auxiliary boom 136.

For transport of media umbilical 144 is provided at bottom 145 of gangway boom 118. It will be understood that umbilical 144 can alternatively be provided at another location of boom 118. One of the hoist systems 106,138 may guide umbilical 144 when positioning umbilical 144 for transfer of media from or to vessel 2 and/or when removing umbilical 144 after transport has been completed.

According to the invention the illustrated system 104 takes one or more, and in the illustrated embodiment all, of the following environmental and design conditions into account:

Highly corrosive marine environment;
Working area world wide, excluding arctic areas;
Ambient temperature −20° up to +45°;
Structural design temperature −20°;
Hazardous area Safe area only; and
Design life 15-25 years, for example 20 years.

The illustrated telescopic gangway boom 118 is provided with Active Heave Control (AHC) system 146. Transfer system 104 comprises a standard container size box (10' ISO container size) 148 with two electrical, frequency controlled hydraulic power units 150. It will be understood that many of the above sub-systems and features are optional.

The illustrated crane 106 achieves the following performances:

SWL 10 t
Minimal operational distance to AU 10 m
Maximum operational distance to AU 30 m
Operational horizontal angle (SB-PS) −30° to 30° (preferred maximum angles)
Weight of system ~30 t
Max seastate
SWL (Human Transfer, HT) 1 t
SWL (Fluid media equipment 1 t comprising umbilical 144 (simultaneous operation with HT)
Minimal operational distance to AU 14 m
Maximum operational distance to AU 24 m
Operational horizontal angle (SB-PS) −20° to 20°
Weight of system ~20 t.

In the illustrated embodiment system 104 has a maximum SWL versus radius of 20 t at 16 meter and SWL versus maximum radius of 8 t at 23 meter. Minimum work radius Rmin is 5.5 meter and maximum work radius Rmax is 23 meter. Hook speed is in the range of 0-15 m/min on average and hook travel is about 200 m single line. Rotating is CW/CCW 1 rpm as preferred maximum. Bridge width is 1300-1700 mm, preferably about 1500 mm, retracted length 20 meter, extended length 32 meter and operational stroke S is 12 meter. Operational luffing angle is about plus and minus 15 degrees. Maximum adjusting height is 21.4 meter. The material of the crane is high grade steel. The diameter of pedestal 6 is about 2.5 meter. Maximum total length is 35 meter and the maximum height tolerance or operating height H is 16.3 meter.

It will be understood that other dimensions according to the invention are also possible depending on the specific operating conditions, for example. Also, parts of the system according to the invention can be exchanged with parts illustrated for a prior art system in any of FIGS. 1-6 and/or such parts can be added to the system according to the present invention.

In the disconnected mode vessel 102 moves towards accessible unit (AU), for example an offshore windmill or a quay 110. After connecting gangway 152 of gangway boom 118 to unit 110 persons P and/or goods may transfer between vessel 102 and unit 110.

Transfer system 202 (FIGS. 8 and 9A-F) comprises pedestal 204, gangway 206 acting as integrated gangway boom crane that is connected to pedestal 204 with hinge 208 connected to the base frame 215 such that gangway 206 can rotate around axis 210. Pedestal 204 is preferably positioned stationary relative to the vessel. Gangway 206 can rotate around axis 212 involving a slew bearing. Actuator 214 is responsible for rotating gangway 206 around axis 210. In the illustrated embodiment actuator 214 enables rotation of the integrated gangway 206 relative to pedestal 204 over a relative large window of luffing angles, preferably in a range of −23° (lower illustration in FIG. 9F) to +27° (upper illustration in FIG. 9F), or alternatively −20° to +25°. Actuator 214 is preferably provided between the base frame 215 and first part 216 of gangway 206. Preferably, the pedestal may rotate over a maximum slew angle of 360°.

Gangway 206 comprises first part 216 that is connected to base frame 215, and second part 218 that can be telescopically moved relative to first part 216 using drive 219 and guiding elements 220. Drive 219 may extend gangway 206 from a retracted length of about 30 m to an extended length of about 50 m. It will be understood that other lengths would also be applicable according to the invention. In the illustrated embodiment one end of second part 218 is maintained within first part 216, while the other end of second part 218 is provided with exit part 222 and rests with support 224 on surface 226 of landing zone 228.

In the illustrated embodiment transfer system 202 further comprises cabin 230 and entrance door 232 in base frame 215. Entrance part 234 provides access to base frame 215 where in the illustrated embodiment the HPU is located. Access 236 can be reached using stairs of the vessel, for example.

When transferring people transfer system 2 is connected to the AU by rotating gangway 206 relative to base frame 215 with actuator 214, rotating gangway 206 relative to pedestal 204, and manipulating the length of gangway 204 by driving second part 218 to the desired position with drive 219. After connecting to the AU people may access gangway 206 and transfer between the vessel and the AU.

The illustrated transfer system 202 is provided with vertical displacement compensation means, preferably in connection with actuator 214, involving compensation around axis 210. Optionally, drive 219 is provided with horizontal compensation means. Also, rotatable compensation means for compensation around one or more of the axes 210, 212 are provided. Optionally, a hoist system and/or auxiliary hoist system are provided.

It will be understood that components of the systems and embodiments shown can be applied to other embodiments, such as the hoist systems, umbilical, compensation means etc.

The present invention is by no means limited to the above described preferred embodiments thereof. The rights sought are defined by the following claims on the scope of which many modifications can be envisaged. For example, the functionality can be further improved by enabling a so-called free float of the telescopic access bridge/gangway. This may involve the use of actuators with 0 stroke volume. Furthermore, as a safety precaution a mechanical connection can be provided between the bridge/gangway and the accessible unit such that the connection can be released when required/necessary.

The invention claimed is:

1. Transfer system for transferring persons and/or goods from and/or to a floating ship to and/or from a structure, comprising:
   a pedestal;
   an integrated gangway boom crane connected to the pedestal; and
   an actuator acting between the pedestal and the integrated gangway boom crane configured for rotating the integrated gangway boom crane relative to the pedestal,
   wherein the integrated gangway boom crane comprises a base frame and is rotatable around a substantially vertical axis relative to the pedestal, and
   wherein the integrated gangway boom crane comprises an actuator in communication with vertical displacement compensation means between the pedestal and the structure.

2. Transfer system according to claim 1, further comprising a hoist system that is integrally coupled to the gangway boom crane.

3. Transfer system according to claim 1, wherein the integrated gangway boom crane comprises at least two telescopic parts.

4. Transfer system according to claim 3, wherein the integrated gangway boom crane comprises locking and/or clamping means for locking and/or clamping the telescopic parts when in use.

5. Transfer system according to claim 1, wherein the integrated gangway boom crane comprises an auxiliary boom.

6. Transfer system according to claim 5, wherein the auxiliary boom comprises a first hinge enabling rotation around a substantial horizontal axis.

7. Transfer system according to claim 6, wherein the auxiliary boom comprises a second hinge enabling rotation around a substantial vertical axis.

8. Transfer system according to claim 7, wherein the auxiliary boom comprises at least two telescopic parts.

9. Transfer system according to claim 1, further comprising an auxiliary hoist system.

10. Transfer system according to claim 1, wherein the integrated gangway boom crane further comprising a umbilical for transfer of media fluids.

11. Transfer system according to claim 1, the system further comprising connecting means for connecting the system to the structure.

12. Transfer system according to claim 1, wherein the integrated gangway boom crane comprises supporting means for supporting the telescopic gangway after connecting to an accessible unit.

13. Transfer system according to claim 1, wherein the integrated gangway boom crane comprises a wireline for connection to the accessible unit.

14. Transfer system according to claim 1, further comprising a power supply integrated into a housing of the transfer system.

15. Transfer system according to claim 1, wherein the actuator is configured to enable rotation of the integrated gangway relative to the pedestal around a substantial horizontal axis with an angle in a range of −25° to +30° relative to a horizontal.

16. Ship provided with a transfer system of claim 1.

17. Method for transferring persons and/or goods from and/or to a floating ship, wherein the floating ship comprises a transfer system according to claim 1.

18. Transfer system for transferring persons and/or goods from and/or to a floating ship to and/or from a structure, comprising:
   a pedestal;
   an integrated gangway boom crane connected to the pedestal; and
   an actuator acting between the pedestal and the integrated gangway boom crane configured for rotating the integrated gangway boom crane relative to the pedestal, wherein the integrated gangway boom crane comprises at least one actuator configured to provide vertical displacement compensation between the pedestal and the structure.

19. Transfer system for transferring persons and/or goods from and/or to a floating ship, comprising:
   a pedestal;
   an integrated gangway boom crane connected to the pedestal; and
   an actuator acting between the pedestal and the integrated gangway boom crane configured for rotating the integrated gangway boom crane relative to the pedestal, wherein the actuator is configured for vertical displacement compensation.

20. Transfer system for transferring persons and/or goods from and/or to a floating ship, comprising:
   a pedestal;
   an integrated gangway boom crane connected to the pedestal; and
   an actuator acting between the pedestal and the integrated gangway boom crane configured for rotating the integrated gangway boom crane relative to the pedestal, and wherein the actuator is configured for vertical displacement compensation, and wherein the actuator is configured to enable rotation of the integrated gangway relative to the pedestal around a substantial horizontal axis with an angle in a range of −25° to +30° relative to a horizontal.

* * * * *